3,273,145
TRAIN SLACK MEASURING APPARATUS
Ivan L. Joy and James W. Luehring, Topeka, Kans.;
Ivan L. Joy as trustee
Filed Feb. 16, 1965, Ser. No. 433,114
9 Claims. (Cl. 343—6)

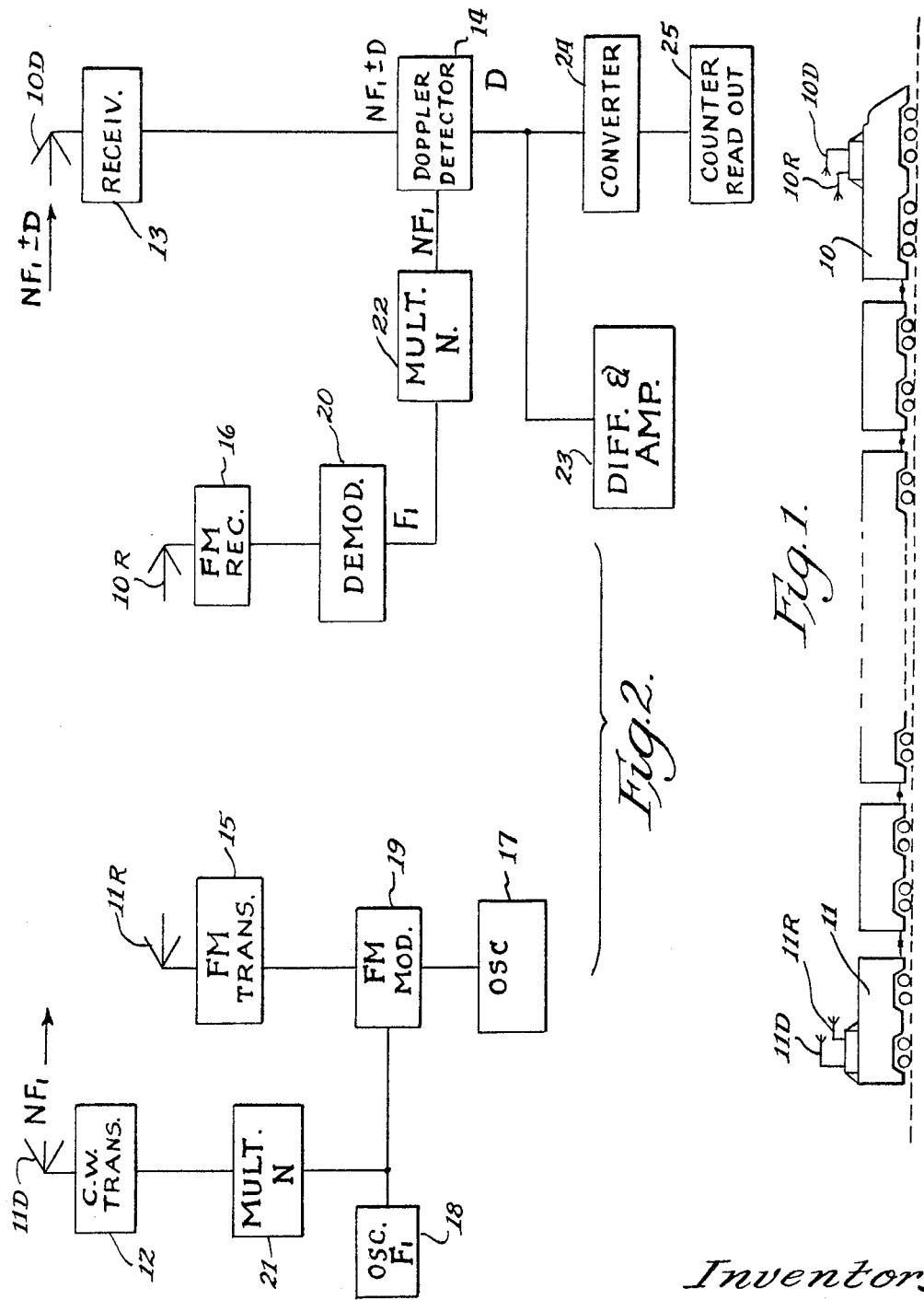

This invention relates to radio transmission apparatus for measuring position variations occurring between a pair of objects which are capable of undergoing relative movement and more particularly the invention is concerned with radio transmission apparatus located at opposite ends of a train for determining train slack conditions by measuring changes in the length of the train.

In recent years, freight trains of increasingly greater length are being operated at higher and higher speeds and the slack action occurring in trains operating under such conditions has become an increasingly serious problem leading to many claims for damage to lading in transit and for personal injury to the train men.

There is no certain procedure for handling a freight train to insure complete elimination of the sharp slack action. This is due in part to the fact that no two freight trains or engines handle exactly alike, and up to the present time there has been no convenient means for measuring the amount of slack existing at any given time during the operation of the freight train.

Accordingly, the principal object of the invention is the provision of radio transmission apparatus for mounting on opposite ends of a train to measure any changes in the over-all train length and present an indication of the train slack condition at any given time.

According to the invention, there is provided radio transmission apparatus for a train including a transmitter of a continuous wave fixed frequency signal mounted on the caboose and a receiver mounted on the engine to feed a Doppler detector which counts the difference between the number of cycles transmitted from the caboose and the number of cycles received at the engine. Starting with some fixed train length selected as a reference, for example when maximum slack run-out is believed to exist, it will be apparent that as the slack begins to run in and the caboose thus is moving relatively closer to the engine, the receiver in the engine will pick up a greater number of cycles than the transmitter emits from the caboose. The number of cycles difference is due to Doppler effect and for a given fixed frequency at the transmitter, thus difference serves as a measure of the change in the distance between the engine and the caboose. For example at a frequency of 4680 megacycles the wave length is such that each cycle represents 1/10 of a foot.

An important feature of the invention resides in the provision of an arrangement for maintaining exact synchronism between a reference frequency signal at the caboose for controlling its transmitter and a reference frequency signal at the engine and supplied to the Doppler detector for comparison with the received signal. For this purpose, it is preferred to employ an FM modulated radio transmission circuit also operating between the caboose and engine, as the FM modulation component is unaffected by the Doppler effect.

Other and further objects and advantages of the present invention will be apparent from the following description and claims, and are illustrated in the accompanying drawings which show structure embodying preferred features of the present invention and the principles thereof, and what is now considered to be the best mode in which to apply these principles.

In the accompanying drawings forming a part of this specification, and in which like numerals are employed to designate like parts throughout the same, FIG. 1 is a diagrammatic illustration of a railway train illustrating radio transmission equipment mounted on the engine and on the caboose; and FIG. 2 is a block diagram of a circuit arrangement of the radio transmission apparatus that is employed on the engine and on the caboose for enabling measurements of variations in train length.

Referring now to the drawings, the train as represented in FIG. 1 is illustrated with an engine 10 at the front end and a caboose 11 at the rear end. In normal practice today the train may include 100 or more cars making it impossible for the engineer to observe directly the slack action of the entire train. The lack of information as to the slack action coupled with the added difficulties occasioned by long trains operating at high speeds has made control of slack an increasingly complex and dangerous problem.

In accordance with this invention, the engine is equipped with a Doppler channel antenna 10D and a reference frequency channel antenna 10R and the caboose is equipped with a Doppler channel antenna 11D and with a reference frequency channel antenna 11R. In the preferred practice of the invention these are directional radiation antennas with the antennas 10D and 11D being coupled and with antennas 10R and 11R being coupled. In the Doppler channel, a continuous wave transmitter 12 is located in the caboose and drives the antenna 11D to provide a radiated signal at a frequency of $NF_1$ directed at the engine antenna 10D whenever the train is on straight track. A Doppler channel receiver 13 is connected to the antenna 10D and is mounted in the engine. The frequency seen by the receiver 13 will be $NF_1$, the same as that emitted at the transmitter 12, unless there is relative movement between the antennas 10D and 11D, in which case a shift in the received frequency due to Doppler effect is produced in an amount of D cycles, with the value of D representing the relative speed of approach or separation as between the engine and caboose.

A Doppler detector 14 is connected to the receiver 13 to be fed with signals at the frequency ($NF_1 \pm D$). The detector 14 is also fed with a reference signal at the frequency of the transmitted signal employed in the Doppler channel.

Since the Doppler effect occasioned by changes in train length is relatively slight, a high degree of accuracy is required and exact synchronization must be provided as between the transmitter and receiver locations.

An FM radio transmission circuit is coupled between the caboose and engine to establish a reference frequency signal in exact synchronism at each end of the train. The FM circuit in the preferred form, illustrated herein for purposes of disclosure, includes an FM transmitter 15 mounted in the caboose and an FM receiver 16 mounted in the engine. An oscillator 17 is provided in the caboose to provide a carrier signal source of any desired frequency for the FM transmitter 15 of the reference frequency channel.

The reference frequency at the caboose is provided from a stable oscillator 18 which operates at a frequency $F_1$ and is connected through an FM modulator A for applying FM modulation to the carrier signal from the first oscillator 17. The FM modulated signal from the antenna 11R is picked up by the engine antenna 10R which connects to the FM receiver 16 at the engine. A demodulator 20 is connected to the FM receiver 16 to recover the single tone reference signal of frequency $F_1$. Thus, the reference frequency signal which is provided by the oscillator 18 in the caboose and the reference frequency signal received by the demodulator 20 are identical in frequency.

At the caboose 11, the reference frequency signal from the oscillator 18 is passed through a multiplier 21 where it is multiplied in frequency by a factor and then applied to the C.W. transmitter 12 of the Doppler channel. At the engine, the reference frequency signal is passed through a multiplier 22 which multiplies by the same factor N and the resultant frequency $NF_1$ is applied to the Doppler detector 14 for comparison with the frequency of the signal that is transmitted over the Doppler channel. The Doppler detector 14 may be a mixer or beat note detector to produce a difference signal output determined by the Doppler effect associated with relative movements between the caboose and the engine.

The output from the Doppler detector 14 is connected to a differentiator and amplifier 23 which provides output proportional to the instantaneous value of the Doppler frequency D, thus representing the speed of slack run-in or slack run-out. The output from the Doppler detector 14 is also applied to a converter 24 or directional counter capable of algebraically totalizing the difference in the number of cycles applied at the two inputs to the detector 14. Thus, the converter 24 responds to the detector output in a fashion to give effect to the direction of relative movement between the caboose and the engine.

A counter read-out unit 25 is actuated by the converter to give a digital read-out which is calibrated in any convenient units of length.

It will be noted that the converter totals the difference between the number of cycles emitted at the transmitter 12, this being identical with the number of cycles in the output from the multiplier 22 at the engine, and the number of cycles appearing at the receiver 13 at the engine. When no relative movement occurs, the count in the converter 24 remains unchanged. As the caboose moves closer to the engine during slack run-in, a greater number of cycles are applied to the detector 14 from the receiver 13 then from the multiplier 22 and the counter read-out changes in direct proportion to the number of cycles to vary the slack reading presented by the counter read-out 25. From this point, if slack should run out a lesser number of cycles are applied to the detector 14 by the receiver 13 than by the multiplier 22 and this amount is subtracted from the previous total in the converter. Thus the counter read-out 25 gives a digital read-out measured in terms of feet and representative of the train slack condition at any given instant.

The principal purpose of the invention therefore is to give the engineer a direct read-out of instantaneous slack condition of the train and the preferred use of the equipment under actual train operating conditions may now be described in relation to this. When the engineer starts the train from a terminal, he operates the engine in a fashion to slowly take up slack until the caboose begins moving. The counter read-out 25 in the engine is then set to zero to serve as a fixed reference during this run. By way of example, assuming the engineer starts using the dynamic brakes 20 miles down the line, the cars of the train begin to bunch. The read-out 25 in the engine provides an indication in feet of the amount of slack run-in due to this bunching and the amplifier 23 in the engine provides an indication of the speed of slack run-in. This provides intelligence which is important in guiding the engineer in the application of dynamic braking and air braking in a manner to avoid excessive shock conditions in the train. As the braking sequence is continued, the engineer can observe when all of the slack has run in, for example a read-ing of 30 feet, and this gives the engineer a knowledge of the exact amount of slack action which can occur in this particular train.

The read-out 25 maintains a reading of 30 feet as long as the full slack run-in condition exists. When power is again applied and train slack runs out, the read-out will progress from an indication of 30 feet to 29 to 28 and so on down to zero feet of slack run-out at which time the engineer will know that the train is again fully stretched and full power can be applied without endangering the cargo or crew members.

Continuing this actual operations example, the time when the engineer has pulled the train to the next terminal where the train is turned over to another engineer may be considered. Upon stopping at the terminal, the train may have a bunched slack condition indicated on the read-out of say 15 feet. This reading of 15 feet remains on the read-out as long as the train length is unchanged whether this involves an interval of a minute or a week. The next engineer operating the train can observe the slack condition indicated on the read-out and regulate the application of power to the train in a manner similar to that already described.

It is recognized that when the train is passing around curves or across hilly terrain the coupling relation between the antennas is interrupted. This interferes with normal operations only if the train length changes during such intervals but following such interruptions the engineer may immediately recalibrate the slack read-out and proceed as already described.

In a preferred arrangement, the operating frequency of the reference signal oscillator in the caboose is selected at about 200 kilocycles and this value is multiplied to apply to the Doppler system a frequency of 1250 megacycles. The carrier frequency produced by the oscillator in the caboose for transmission over the FM system may be 1240 megacycles. At this range in the microwave spectrum each cycle due to Doppler effect represents a change in train length of about three inches and for a train having a total slack variation of 30 feet only slightly more than 100 cycles difference is measured in the Doppler detector. Thus, accuracy requirements are high and necessitate exact synchronization of the reference signals at the engine and the caboose. The Doppler detector 14 preferably utilizes a frequency to frequency discriminator arrangement such as is shown at 121 in Joy application Serial No. 841,972 filed Sept. 24, 1959, now Patent No. 3,209,220. The frequency to frequency discriminator exhibits high accuracy and fully satisfies the exacting requirements of the arrangement disclosed herein.

Thus, while preferred constructional features of the invention are embodied in the structure illustrated herein, it is to be understood that changes and variations may be made by those skilled in the art without departing from the spirit and scope of the appended claims.

What is claimed is:

1. Apparatus for measuring position variations between front and rear ends of a train, and comprising means at one end of said train for generating a fixed frequency reference signal, means at said one end for transmitting a radiated carrier signal having an FM modulation component derived from said reference signal, means at the other end of said train for receiving and demodulating said carrier signal to provide output consisting of said reference signal, means at the rear end for transmitting a radiated continuous wave signal derived from and consisting of a certain frequency multiple of the reference signal thereat, means at the front end for receiving said continuous wave signal at a Doppler shifted frequency, and means at the front end connected to respond to any frequency difference between said certain frequency multiple of the reference signal at the front end and the received Doppler shifted frequency for producing a signal representative of position variations between said front and rear ends of the train.

2. Apparatus for measuring position variations between front and rear ends of a train, and comprising means at one end of said train for generating a fixed radio frequency reference signal, means at said one end for transmitting a radiated microwave carrier signal having an FM modulation component derived from said reference signal, means at the other end of said train for receiving and demodulating said carrier signal to provide output consisting of said reference signal, means at the rear end for transmitting a radiated continuous wave microwave frequency signal derived from and consisting of a certain frequency multiple of the radio frequency reference signal thereat, means at the front end for receiving said continuous wave signal at a Doppled shifter frequency, and means at the front end connected to respond to any frequency difference between said certain frequency multiple of the reference signal at the front end and the received Doppler shifted frequency for producing a signal representative of position variations between said front and rear ends of the train.

3. Apparatus for measuring position variations between front and rear ends of a train, and comprising means at the rear end for generating a fixed frequency reference signal, means at the rear end for transmitting a radiated continuous wave signal at a certain frequency multiple of said reference signal, means at the rear end for transmitting a radiated carrier signal having an FM modulation component derived from said reference signal, means at the front end for receiving and demodulating said carrier signal to provide output at said reference signal frequency, means at the front end for multiplying said output by said certain frequency multiple to provide a comparison signal at the frequency of said radiated continuous wave signal, means at the front end for receiving said continuous wave signal at a Doppler shifted frequency, and means at the front end connected to respond to any frequency difference between the comparison signal and the received Doppler shifted frequency for producing a signal representative of position variations between said front and rear ends of the train.

4. Apparatus for measuring position variations between front and rear ends of a train, and comprising means at the rear end for generating a fixed radio frequency reference signal, means at the rear end for transmitting a radiated continuous wave microwave frequency signal at a certain frequency multiple of said reference signal, means at the rear end for transmitting a radiated microwave frequency carrier signal having an FM modulation component derived from said reference signal, means at the front end for receiving and demodulating said carrier signal to provide output at said reference signal frequency, means at the front end for multiplying said output by said certain frequency multiple to provide a comparison signal at the frequency of said radiated continuous wave microwave frequency signal, means at the front end for receiving said continuous wave signal at a Doppler shifted frequency, and means at the front end connected to respond to any frequency difference between the comparison signal and the received Doppler shifted frequency for producing a signal representative of position variations between said front and rear ends of the train.

5. Apparatus for measuring position variations between front and rear ends of a train, and comprising means at one end constituting a source providing a fixed radio frequency reference signal, means at said one end for transmitting a radiated carrier signal having an FM modulation component derived from said reference signal, means at the other end for receiving and demodulating said carrier signal to constitute a source providing output at a frequency determined by said reference signal, means at the rear end connected to the said source thereat for transmitting a continuous wave radiated signal at a microwave frequency that is a certain frequency multiple of the reference signal, provided by the source at said rear end, means at the front end for receiving said continuous wave signal at a Doppler shifted frequency, means at the front end and connected to the said source thereat for producing a comparison signal at said certain frequency multiple of the reference signal provided by the source at said front end, and means at the front end connected to respond to any frequency difference between the comparison signal and the received Doppler shifted frequency for producing a signal representative of position variations between said front and rear ends of the train.

6. Apparatus for measuring position variations between first and second relatively movable stations, and comprising means at one of said stations for generating a fixed frequency reference signal, means at said one station for transmitting a radiated carrier signal having an FM modulation component derived from said reference signal, means at the other of said stations for receiving and demodulating said carrier signal to provide output consisting of said reference signal, means at said first station for transmitting a radiated continuous wave signal derived from and consisting of a certain frequency multiple of the reference signal thereat, means at said second station for receiving said continuous wave signal at a Doppler shifted frequency, and means at said second station connected to respond to any frequency difference between said certain frequency multiple of the reference signal at said second station and the received Doppler shifted frequency for producing a signal representative of position variations between said stations.

7. Apparatus for measuring position variations between first and second relatively movable stations, and comprising means at one of said stations for generating a fixed radio frequency reference signal, means at said one station for transmitting a radiated microwave carrier signal having an FM modulation component derived from said reference signal, means at the other of said stations for receiving and demodulating said carrier signal to provide output consisting of said reference signal, means at the first station for transmitting a radiated continuous wave microwave frequency signal derived from and consisting of a certain frequency multiple of the radio frequency reference signal thereat, means at the second station for receiving said continuous wave signal at a Doppler shifted frequency, and means at the second station connected to respond to any frequency difference between said certain frequency multiple of the reference signal at the second station and the received Doppler shifted frequency for producing a signal representative of position variations between said stations.

8. Apparatus for measuring position variations between first and second relatively movable stations, and comprising means at the first station for generating a fixed frequency reference signal, means at the first station for transmitting a radiated continuous wave signal at a certain frequency multiple of said reference signal, means at the first station for transmitting a radiated carrier signal having an FM modulation component derived from said reference signal, means at the second station for receiving and demodulating said carrier signal to provide output at said reference signal frequency, means at the second station for multiplying said output by said certain frequency multiple to provide a comparison signal at the frequency of said radiated continuous wave signal, means at the second station for receiving said continuous wave signal at a Doppler shifted frequency, and means at the second station connected to respond to any frequency difference between the comparison signal and the received Doppler shifted frequency for producing a signal representative of position variations between said stations.

9. Apparatus for measuring position variations between first and second relatively movable stations, and comprising means at the first station for generating a fixed radio frequency reference signal, means at the first station for transmitting a radiated continuous wave microwave frequency signal at a certain frequency multiple of said reference signal, means at first station for transmitting a radiated microwave frequency carrier signal having an FM modulation component derived from said reference signal, means at the second station for receiving and demodulating said carrier signal to provide output at said reference signal frequency, means at the second station for multiplying said output by said certain frequency multiple to provide a comparison signal at the frequency of said radiated continuous wave microwave frequency signal, means at the second station for receiving said continuous wave signal at a Doppler shifted frequency, and means at the second station connected to respond to any frequency difference between the comparison signal and the received Doppler shifted frequency for producing a signal representative of position variations between said station.

No references cited.

CHESTER L. JUSTUS, *Primary Examiner.*

R. D. BENNETT, *Assistant Examiner.*